(12) United States Patent
Koseki et al.

(10) Patent No.: US 6,230,978 B1
(45) Date of Patent: *May 15, 2001

(54) CARD EJECTION DEVICE OF ELECTRONIC CARD CONNECTOR

(75) Inventors: Yoshitsugu Koseki, Nagono (JP); Hung-Chi Yu, Hsi-Chih; Ming-Chun Lai, Shin-Juang, both of (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

This patent is subject to a terminal disclaimer.

(21) Appl. No.: 09/359,410

(22) Filed: Jul. 19, 1999

(30) Foreign Application Priority Data

Dec. 31, 1998 (TW) ................................. 87222085

(51) Int. Cl.⁷ ........................... G06K 13/00; G06K 13/04
(52) U.S. Cl. ........................................... 235/475; 235/479
(58) Field of Search ................... 235/475, 482, 235/483, 479, 495; 439/159

(56) References Cited

U.S. PATENT DOCUMENTS

| | | | |
|---|---|---|---|
| 5,179,505 | * | 1/1993 | Matsuo ................................. 235/495 |
| 5,879,175 | * | 3/1999 | Muramatsu et al. ................. 235/479 |
| 5,997,324 | * | 12/1999 | Ho et al. ............................... 439/159 |
| 6,086,393 | * | 7/2000 | Tung et al. ........................... 439/159 |
| 6,095,834 | * | 8/2000 | Lai et al. .............................. 439/159 |
| 6,123,560 | * | 9/2000 | Hara et al. ............................ 439/159 |

* cited by examiner

Primary Examiner—Karl D Frech
Assistant Examiner—Larry D. Taylor
(74) Attorney, Agent, or Firm—Wei Te Chung

(57) ABSTRACT

A card ejection device of an electronic card connector includes a card driving portion and a manual operation portion. A shielding member includes a plate for substantially shielding the connector and two side walls extending therefrom. The card driving portion includes a rocking member rotated by a follower bar to eject an electronic card received in the connector. The manual operation portion includes a casing mounted to the side wall of the shielding member. A cam plate is fixed in one side wall of the casing and defines a closed-loop groove. A push bar is movably received in the casing and overlaps the cam plate. A slider is arranged between the push bar and the cam plate. The slider defines a hole for receiving a pivot of the push bar and forms a pin movably received in the groove of the cam plate whereby when the push bar is manually operated, the groove guides the movement of the slider and the push bar. A biasing spring is arranged between the cam plate and the push bar to bias the push bar to an un-actuated position. The slider has a transverse projection contacting the follower bar for driving the follower bar to rotate the rocking member when the push bar is actuated.

14 Claims, 6 Drawing Sheets

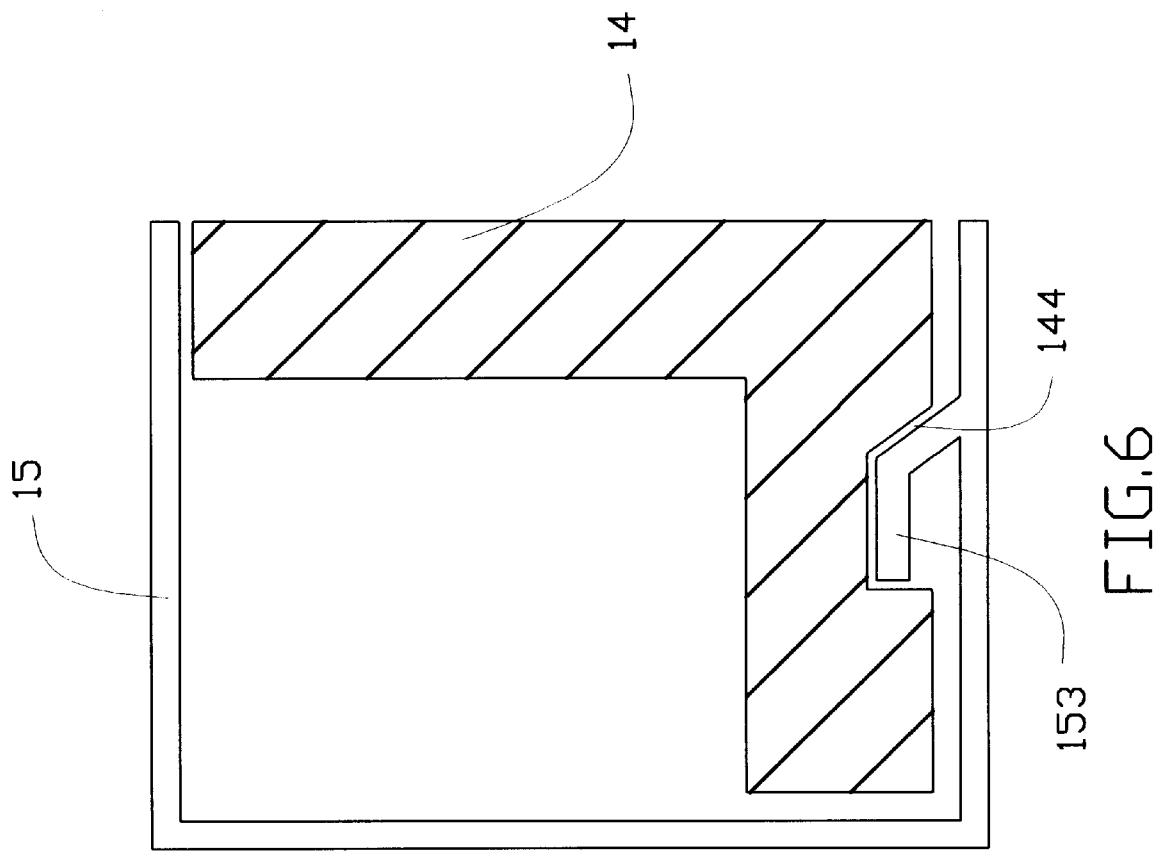

CARD EJECTION DEVICE OF ELECTRONIC CARD CONNECTOR

BACKGROUND OF THE INVENTION

1. Field of the Invention

The present invention generally relates to an electronic card connector, and in particular to a modularized card ejection device of an electronic card connector.

2. The Prior Art

Electronic cards, such as PCMCIA cards and memory cards, have been widely used for expanding resources of a computer. An electronic card connector is incorporated in a computer or a similar device to connect an electronic card to the computer. The electronic card connector is often equipped with a card ejection device for selectively ejecting an electronic card from the connector. Examples of card ejection devices are disclosed in Taiwanese Patent Application Nos. 83111731, 83205851, 85103753 and 86210606.

FIG. 1 of the attached drawings shows a conventional electronic card connector. The electronic card connector includes a header 7 retaining contacts (not shown) therein, a metal plate 6 shielding the header 7, and a frame 8 fixed to the header 7 and comprising two opposite guide arms 5. One of the guide arms 5 defines a recess 51 for accommodating a card ejection device 4. Thus, the card ejection device 4 is integrated with the frame 8 of the connector thereby complicating the manufacturing process of the electronic card connector and prohibiting modularization of the card ejection device 4. Furthermore, the card ejection device 4 comprises a number of components requiring a large amount of space for accommodation. Therefore, the size of the frame is significantly increased.

In addition, the conventional electronic card connector is only shielded by the metal plate 6 disposed above the header 7, which may be insufficient for an electronic card connector located proximate different electronic devices since electromagnetic interference may come from all directions.

Thus, it is desirable to provide a modularized card ejection device of an electronic card connector for eliminating the problems discussed above.

SUMMARY OF THE INVENTION

Accordingly, an object of the present invention is to provide a modularized card ejection device of an electronic card connector for facilitating assembly and conserving space.

Another object of the present invention is to provide an electronic card connector having excellent electrical shielding properties.

To achieve the above objects, a card ejection device of an electronic card connector in accordance with the present invention comprises a card driving portion and a manual operation portion. A shielding member includes a plate for substantially shielding the connector and two side walls extending therefrom. The card driving portion includes a rocking member rotated by a follower bar to eject an electronic card received in the connector. The manual operation portion includes a casing mounted to the side wall of the shielding member. A cam plate is fixed in one side wall of the casing and defines a closed-loop groove. A push bar is movably received in the casing and overlaps the cam plate. A slider is arranged between the push bar and the cam plate. The slider defines a hole for receiving a pivot of the push bar and forms a pin movably received in the groove of the cam plate whereby when the push bar is manually operated, the groove guides the movement of the slider and the push bar. A biasing spring is arranged between the cam plate and the push bar to bias the push bar to an un-actuated position. The slider has a transverse projection contacting the follower bar for driving the follower bar to rotate the rocking member when the push bar is actuated.

BRIEF DESCRIPTION OF THE DRAWINGS

The present invention will be apparent to those skilled in the art by reading the following description of a preferred embodiment thereof, with reference to the accompanying drawings, in which:

FIG. 6 is a cross-sectional view taken along line VI—VI of FIG. 5 with a push bar removed.

DETAILED DESCRIPTION OF THE PREFERRED EMBODIMENT

Figure 1:
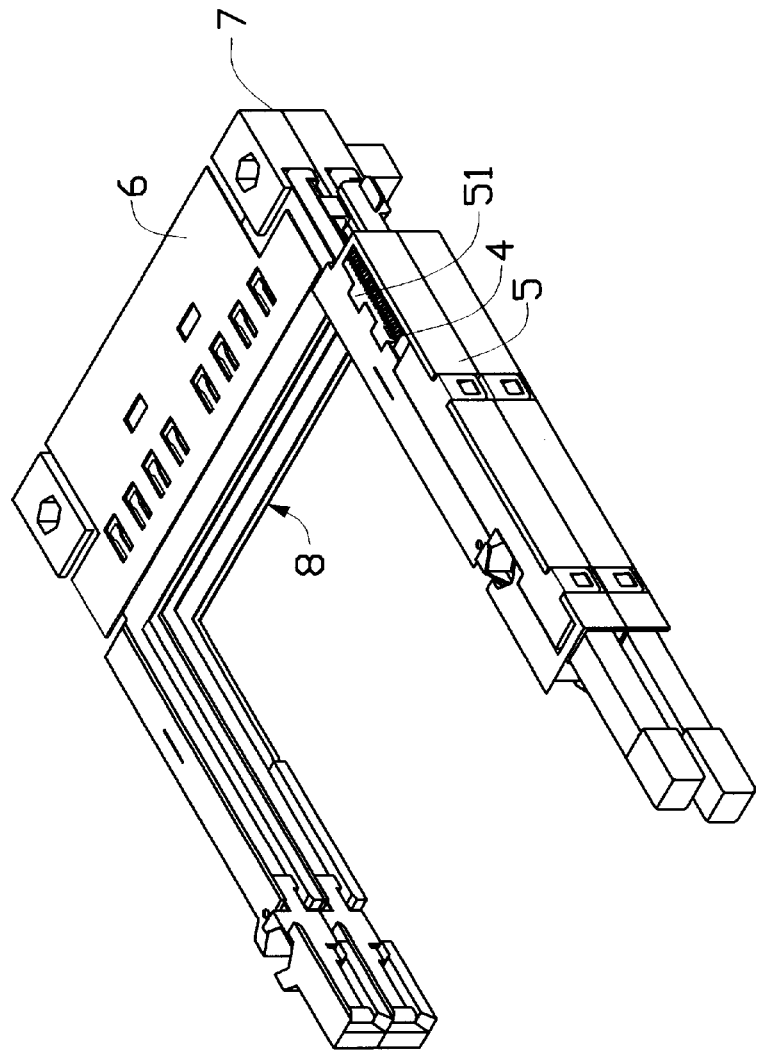
FIG. 1 is a perspective view of a conventional electronic card connector.
Figure 2:
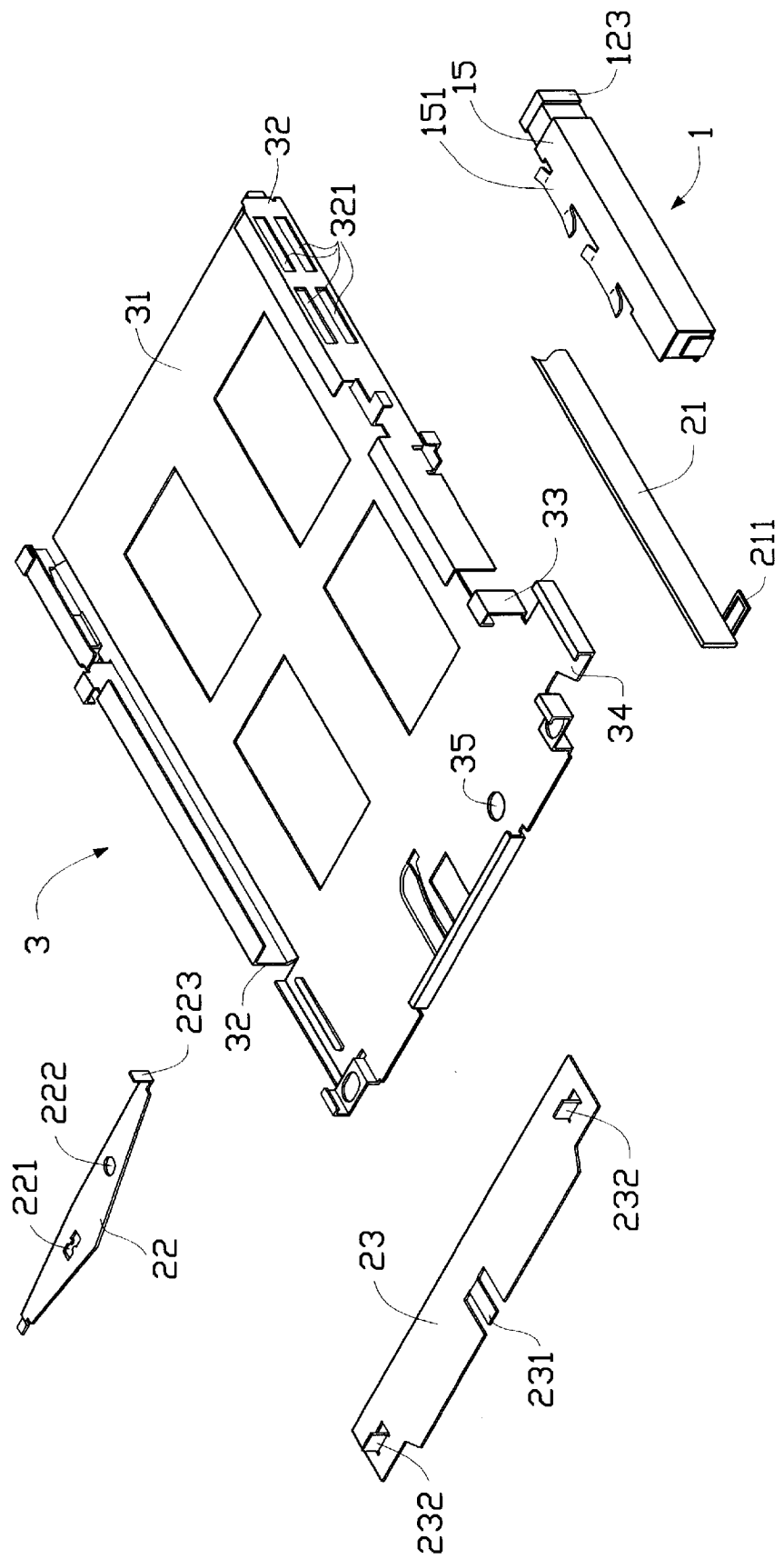
FIG. 2 is an exploded view of a card ejection device of an electronic card connector constructed in accordance with the present invention.
Figure 3:
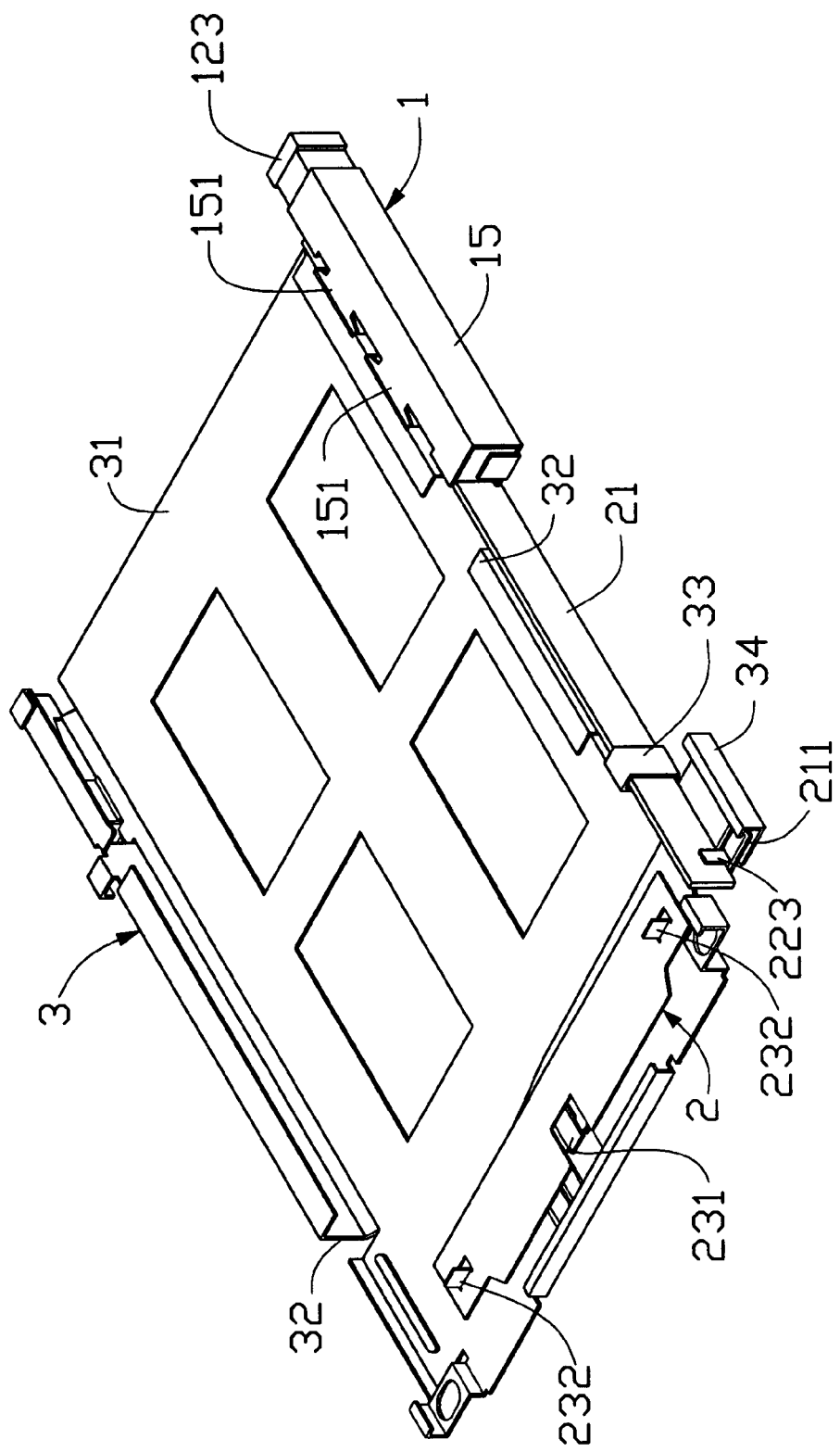
FIG. 3 is an assembled view of FIG. 2.

Referring to the drawings and in particular to FIGS. 2 and 3, a card ejection device in accordance with the present invention comprises a manual operation portion 1, a card driving portion 2 and a shielding member 3. The shielding member 3 comprises a plate 31 substantially sized to cover and shield an electronic card connector (not shown) and two side walls 32 extending from opposite edges of the plate 31. Preferably, the side walls 32 define opposite channels (not labeled) to guide an electronic card (not shown) into a space defined therebetween. Retaining openings 321 are formed on one of the side walls 32 for retaining the manual operation portion 1 thereto. A hole 35 is defined in the plate 31 for rotatably supporting the card driving portion 2.

The card driving portion 2 comprises a rocking member 22 forming a pivot 222 perpendicularly extending therefrom. The pivot 222 is rotatably received in the hole 35 of the plate 31 thereby allowing the rocking member 22 to rotate about the pivot 222 with respect to the plate 31. The rocking member 22 forms a coupling tab 223 at a free end thereof on one side of the pivot 222. A follower bar 21 forms a constraining frame 211 for rotatably receiving and drivably engaging the coupling tab 223. The follower bar 21 is coupled with and actuated by the manual operation portion 1 for rotating the rocking member 22 about the pivot 222.

Preferably, a channel 33 is formed on the shielding member 3 for receiving and guiding the follower bar 21. An extension 34 may be formed on the plate 31 of the shielding member 3 for supporting the constraining frame 211 of the follower bar 21.

The rocking member 22 defines an opening 221 on another side of the pivot 222 opposite the coupling tab 223. A driving plate 23 forms an offset tab 231 received in the opening 221 of the rocking member 22. The opening 221 is configured to allow rotation of the rocking member 22 with respect to the driving plate 23 whereby when the rocking member 22 is rotated about the pivot 222, the driving plate 23 is linearly displaced by means of the engagement between the opening 221 and the tab 231. Two card engaging projections 232 are formed on opposite ends of the driving plate 23 whereby when the driving plate 23 is linearly displaced by the rocking member 22, the card engaging projections 232 drivably engage with an electronic card (not shown) for ejecting the electronic card out of the electronic card connector.

Figure 4:
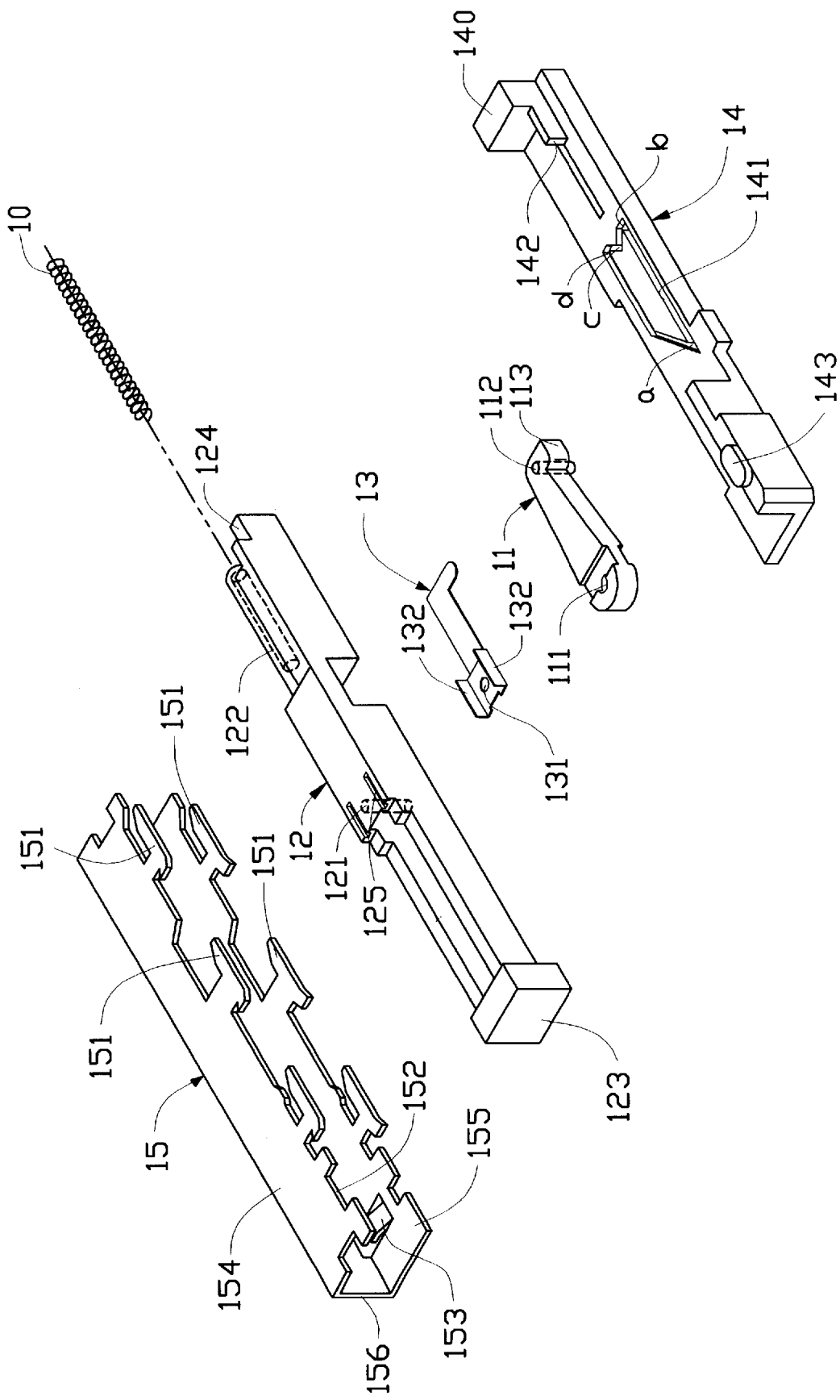
FIG. 4 is an exploded view of a manual operation portion of the card ejection device of the present invention.
Figure 5:
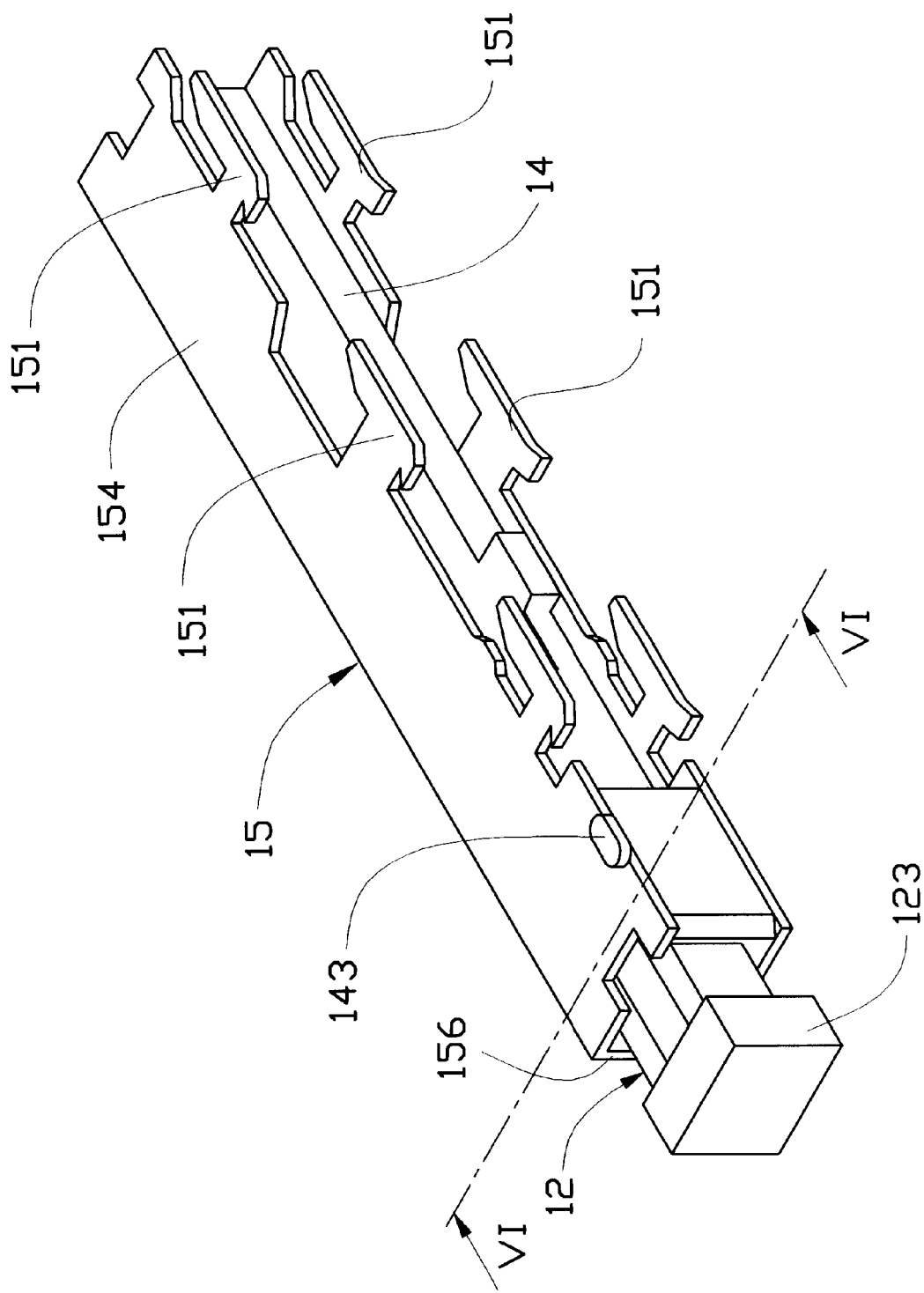
FIG. 5 is an assembled view of FIG. 4.

As shown in FIGS. 4 and 5, the manual operation portion 1 comprises a casing 15 forming a channel defined between opposite first and second side walls 154, 155 thereof connected together by a bottom wall 156. The side walls 154, 155 form latching projections 151 on free edges thereof for releasably engaging with the retaining openings 321 of the shielding member 3 thereby releasably retaining the casing 15 on the shielding member 3.

A cam plate 14 is fixedly received in the casing 15. The cam plate 14 has a top projection 143 snugly received in a notch 152 defined in the first side wall 154 and forms a bottom recess 144 receiving an inward projection 153 formed on the second side wall 155 (FIG. 6) thereby fixing the cam plate 14 in the casing 15.

A push bar 12 is movably received in the casing 15 and partially overlaps the cam plate 14. The push bar 12 has a push button 123 formed on a first end thereof and extending beyond the casing 15 for manual actuation of the push bar 12 and an extension 124 formed on a second end thereof to be slidably engaged with a wall 142 extending from an end block 140 of the cam plate 14 for guiding movement of the push bar 12. A bore 122 is defined in the second end of the push bar 12 for receiving and retaining a helical spring 10. The spring 10 has a remote end extending outside the bore 122 for abutting against the end block 140 of the cam plate 14 whereby a biasing force is formed therebetween.

A slider 11 arranged between the push bar 12 and the cam plate 14 defines a hole 111 for receiving a pivot 121 formed on the push bar 12 thereby pivotally attaching the slider 11 to the push bar 12. The slider 11 forms a pin 112 for being movably received in a groove 141 defined in the cam plate 14. The groove 141 forms a closed loop path along which the pin 113 of the slider 11 may move. A biasing element 13 is interposed between the slider 11 and the push bar 12 for biasing the push bar 12 and the cam plate 14 away from each other to respectively abut against the side walls 154, 155 of the casing 15. In the embodiment shown, the biasing element 13 is a leaf spring with a hole 131 defined therein for receiving the pivot 121 thereby fixing the biasing element 13 to the push bar 12. The pivot 121 of the push bar 12 is axially and movably received in the hole 111 of the slider 11 thereby allowing the push bar 12 to be moved away from the cam plate 14 by the biasing element 13. Preferably, the biasing element 13 forms two anchoring tabs 132 received in corresponding slits 125 defined in the push bar 12 for maintaining the biasing element 13 in position.

The slider 11 forms a transverse projection 113 for contacting and drivably engaging the follower bar 21 of the card driving portion 2 to eject the electronic card out of the electronic card connector.

The closed-loop groove 141 comprises several segments ab, bc, cd, and da. A first push of the push button 123 causes the pin 112 of the slider 11 to move along segment ab toward the end block 140 of the cam plate 14. The pin 112 then moves along segment bc and is retained at point c of the groove 141 thereby maintaining the push bar 12 at an actuated condition against the biasing force of the spring 10. A second push of the push button 123 moves the pin 112 along segment cd to point d of the groove 141. Thereafter, the spring 10 forces the pin 112 to move along segment da back to the original point a of the groove 141 thereby releasing the actuated condition of the push bar 12 and achieving an un-actuated condition thereof. By means of the engagement between the pivot 121 of the push bar 12 and the hole 111 of the slider 11, the push bar 12 is also moved to the original position with the slider 11.

Although the present invention has been described with reference to the preferred embodiment, it is apparent to those skilled in the art that a variety of modifications and changes may be made without departing from the scope of the present invention which is intended to be defined by the appended claims.

What is claimed is:

1. A card ejection device of an electronic card connector, the electronic card connector comprising a shielding member having a plate for shielding the connector and two side walls extending from the plate, comprising:

a card driving portion comprising:
  a rocking member rotatably supported on the plate of the shielding member;
  a driving plate rotatably mounted on the rocking member and forming two card engaging tabs adapted to drivably engage with an electronic card received in the electronic card connector when the rocking member is rotated thereby ejecting the electronic card; and
  a follower bar having an end drivably engaging with the rocking member, the follower bar being movably supported on the shielding member whereby the follower bar rotates the rocking member when moved with respect to the shielding member; and a manual operation portion comprising:
  a casing comprising opposite first and second side walls selectively and releasably mounted to one of the side walls of the shielding member;
  a cam plate fixed in the casing, a guiding groove being defined in the cam plate;
  a push bar movably received in the casing and interposed between one of the side walls of the shielding member and the cam plate, the push bar having an end extending beyond the connector for facilitating manual operation, first biasing means being provided between the push bar and the cam plate for forming a biasing force therebetween; and
  a slider arranged between the cam plate and the push bar and pivotally attached to the push bar, the slider forming a guiding pin movably received in the guiding groove of the cam plate to be guided thereby due to the biasing force of the first biasing means, the slider comprising a transverse projection drivably engaging with an end of the follower bar thereby actuating the follower bar when the push bar is manually displaced.

2. The card ejection device as claimed in claim 1, wherein the first side wall of the casing forms a notch and the second side wall of the casing forms an inward projection, the cam plate forming a top projection snugly received in the notch of the first side wall, the cam plate defining a bottom recess receivably engaging with the inward projection of the second side wall thereby securely fixing the cam plate in the casing.

3. The card ejection device as claimed in claim 1, wherein the first biasing means comprises a helical spring received in a bore defined in a second end of the push bar and having an end extending outside the bore for abutting against an end block formed on the cam plate.

4. The card ejection device as claimed in claim 1 further comprising a second biasing means arranged between the push bar and the cam plate for biasing the push bar and the cam plate away from each other toward corresponding side walls of the casing.

5. The card ejection device as claimed in claim 4, wherein the slider defines a hole for axially and movably receiving a pivot formed on the push bar, the second biasing means comprising a leaf spring interposed between the slider and the push bar for biasing the push bar away from the slider.

6. The card ejection device as claimed in claim 5, wherein the leaf spring forms two tabs received in slits defined in the push bar for maintaining the leaf spring in position.

7. The card ejection device as claimed in claim 1, wherein the side walls of the casing form latching projections on free edges thereof for releasably engaging with openings defined in the side wall of the shielding member for mounting the casing to the shielding member.

8. The card ejection device as claimed in claim 1, wherein the rocking member comprises a pivot rotatably received in a hole defined in the plate of the shielding member.

9. The card ejection device as claimed in claim 1, wherein the driving engagement between the end of the follower bar and the rocking member comprises a constraining frame formed on the end of the follower bar and a coupling tab rotatably received in the constraining frame.

10. The card ejection device as claimed in claim 1, wherein the driving plate forms an offset tab, and wherein the rocking member defines an opening for rotatably receiving the offset tab of the driving plate.

11. An electronic card connector for use with an card inserted therein, comprising:

a shielding member with a plate for shielding the connector, and two side walls extending from the plate;

a card driving portion including a driving plate positioned on the plate for drivably engaging with the inserted card; and a manual operation portion positioned beside one of said side walls and including a casing with therein a push bar moveable along a lengthwise direction of said casing; wherein means for fastening the casing to said one of the side walls are provided on both the casing and said one of the side walls.

12. The connector as claimed in claim 11, wherein said card driving portion further includes a follower bar connected to said driving plate at one end thereof and actuated by the push bar at the other end thereof, and said one of the side walls forms a channel receiving said follower bar therein so as to guide movement of the follower bar in said lengthwise direction.

13. The connector as claimed in claim 12, wherein said push bar actuates the follower bar through a slider which is moved along a closed loop guiding groove defined in a cam plate secured within the casing.

14. The connector as claimed in claim 11, wherein said means includes retaining openings in one of said shielding member and said casing, and latching projections on the other of said shielding member and said casing.

* * * * *